United States Patent
Prasad

(10) Patent No.: US 11,533,682 B2
(45) Date of Patent: Dec. 20, 2022

(54) METHOD FOR COORDINATED SLEEP MODE IN RAN FOR ENERGY SAVINGS

(71) Applicant: Nokia Technologies Oy, Espoo (FI)

(72) Inventor: Athul Prasad, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 818 days.

(21) Appl. No.: 16/325,806

(22) PCT Filed: Aug. 17, 2016

(86) PCT No.: PCT/FI2016/050564
§ 371 (c)(1),
(2) Date: Feb. 15, 2019

(87) PCT Pub. No.: WO2018/033659
PCT Pub. Date: Feb. 22, 2018

(65) Prior Publication Data
US 2021/0385747 A1    Dec. 9, 2021

(51) Int. Cl.
*H04W 52/02*    (2009.01)
*H04W 28/24*    (2009.01)

(52) U.S. Cl.
CPC ....... *H04W 52/0206* (2013.01); *H04W 28/24* (2013.01); *H04W 52/0216* (2013.01); *H04W 52/0232* (2013.01)

(58) Field of Classification Search
CPC ............. H04W 52/0206; H04W 28/24; H04W 52/0216; H04W 52/0232
See application file for complete search history.

(56) References Cited

U.S. PATENT DOCUMENTS

| | | | |
|---|---|---|---|
| 2008/0232310 A1* | 9/2008 | Xu | H04W 52/0216 370/329 |
| 2009/0275342 A1* | 11/2009 | Iwamura | H04L 5/0053 455/452.2 |
| 2011/0261747 A1* | 10/2011 | Wang | H04W 40/22 370/315 |
| 2012/0207069 A1 | 8/2012 | Xu et al. | 370/311 |

(Continued)

FOREIGN PATENT DOCUMENTS

| CN | 104472007 A | 3/2015 |
|---|---|---|
| CN | 105684499 A | 6/2016 |

(Continued)

*Primary Examiner* — Joseph A Bednash
(74) *Attorney, Agent, or Firm* — Harrington & Smith

(57) ABSTRACT

A method and apparatus to receive from a plurality of network nodes, information of sleep mode plans; determine at least one pattern of the time periods that can be used to optimize the sleep modes to provide a highest power savings; and send information of the determined pattern of time periods to use to optimize the sleep modes. A method and apparatus to send towards a network device, information including sleep mode plans of at least one user equipment; negotiate with the aggregation node time periods for the sleep mode plans to determine at least one pattern of time periods that can be used to optimize the sleep mode plans of the at least one user equipment to provide a highest power savings to the at least one user equipment; and receive information of the at least one pattern of time periods to use to provide the highest power savings.

14 Claims, 7 Drawing Sheets

(56) References Cited

U.S. PATENT DOCUMENTS

| | | | | |
|---|---|---|---|---|
| 2015/0092638 A1* | 4/2015 | Dural | ............... | H04W 76/28 |
| | | | | 370/311 |
| 2017/0202052 A1* | 7/2017 | Xu | ............... | H04W 52/0216 |
| 2017/0331670 A1* | 11/2017 | Parkvall | ............ | H04W 52/0245 |
| 2019/0159281 A1* | 5/2019 | Amin | ............... | H04W 36/26 |
| 2019/0215133 A1* | 7/2019 | Pan | ............... | H04W 72/0446 |

FOREIGN PATENT DOCUMENTS

| | | |
|---|---|---|
| EP | 2 360 974 A1 | 8/2011 |
| EP | 2880951 A1 | 6/2015 |
| WO | WO-2014/022847 A1 | 2/2014 |
| WO | WO 2014/032733 A1 | 3/2014 |
| WO | WO 2014/040643 A1 | 3/2014 |

\* cited by examiner

METHOD FOR COORDINATED SLEEP MODE IN RAN FOR ENERGY SAVINGS

CROSS REFERENCE TO RELATED APPLICATION

This patent application is a U.S. National Stage application of International Patent Application Number PCT/FI2016/050564 filed Aug. 17, 2016, which is hereby incorporated by reference in its entirety.

TECHNICAL FIELD

The teachings in accordance with the example embodiments of this invention relate generally to coordinated sleep cycles between devices of a network and, more specifically, relate to coordinated discontinuous transmissions between 5G radio access points and backhaul aggregation points of the network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BH backhaul
DRX discontinuous reception
DTX discontinuous transmission
eNB enhanced node-B, base station
LTE long term evolution
QCI QoS class identifier
QoS quality of service
RAN radio access network
RAP radio access point
RRC Radio Resource Control
sBH self-backhauling Wireless radio access network data traffic will grow exceptionally within the next 20 years due to at least ultra-high resolution video streaming, cloud-based work, entertainment and increased use of a variety of wireless devices. These will include smartphones, tablets and other new devices, including machine type communications for the programmable world. As data traffic increases reducing air interface latency and high data rates contribute to lowering the device's battery consumption. In this regard, fast transitions between sleep and active modes is needed in this high growth area.

It is noted that there has been considered a host of available optimizations for power consumption in the radio access network. However, these proposals mainly consider efficient sleep strategies at the user equipment (UE) and evolved NodeB (eNB). In LTE, various strategies for DRX have been proposed to enable UE to enter power efficient states in idle and connected modes in order to achieve energy efficiency. For an eNB or base station, various DTX strategies for short-term power savings and sleep modes for long term power savings have also been proposed. However, some of these proposals require always-on signaling with broadcast signals which is seen to be limiting short-term sleep strategies that could be employed.

The embodiments of the invention work to enhance and improve sleep mode operations of devices in radio access networks.

SUMMARY

In an example aspect of the invention there is an apparatus, such as a network side apparatus, comprising: at least one processor; and at least one memory including computer program code, where the at least one memory and the computer program code are configured, with the at least one processor, to cause the apparatus to at least: receive from each of a plurality of network nodes, information of sleep mode plans of each of the plurality of network nodes; determine at least one pattern of time periods of the plurality of network nodes that can be used to optimize the sleep mode plans to provide a highest power savings at the plurality of network nodes; and send towards the plurality of network nodes information of the determined at least one pattern of time periods to use to optimize the sleep mode plans to provide the highest power savings at the plurality of network nodes. Here the sleep mode plan means the explicit indication from the 5G-RAP to the aggregation node which could include for e.g., the upcoming subframes in a radio frame where the RAP is planning to be in energy saving or sleep mode. It could also include other indications from the RAP regarding the time offset from which the sleep mode could start and/or end. It could include any other indication from the RAP to the backhaul links about the pattern in time and/or frequency, when the RAP would be in sleep mode and/or would not be sending any data to the UE. This could indicate to the backhaul link about the possible time instances where the backhaul link can also enter energy saving state or sleep mode.

In an example aspect of the invention there is a method comprising: receiving, by a network side device, from a plurality of network nodes, information of sleep mode plans of each of the plurality of network nodes; determining, by the network device, at least one pattern of time periods of the plurality of network nodes that can be used to optimize the sleep mode plans to provide a highest power savings at the plurality of network nodes; and sending, by the network device, towards the plurality of network nodes information of the determined at least one pattern of time periods to use to optimize the sleep mode plans to provide the highest power savings at the plurality of network nodes.

In accordance with the example aspects as described in the paragraphs above, the determined at least one pattern of time periods sent towards the plurality of network nodes comprises at least one pattern of discontinuous reception time periods to be used by the plurality of network nodes for the optimized sleep mode plans.

In accordance with the example aspects as described in the paragraphs above, the information of sleep mode plans is received from each of the plurality of network nodes via a backhaul link which could be a self-backhaul link.

In accordance with the example aspects as described in the paragraphs above, the determining comprises negotiating the time periods for sleep mode plans with at least one of the plurality of network nodes.

In accordance with the example aspects as described in the paragraphs above, the negotiating is performed using the backhaul link which could be a self-backhaul link.

In accordance with the example aspects as described in the paragraphs above, the negotiating is using information elements for coordinated discontinuous transmission mode configuration of the plurality of network nodes.

In accordance with the example aspects as described in the paragraphs above, the received information of sleep mode plans comprises at least one of sleep mode configurations and sleep mode patterns of the plurality of network nodes.

In accordance with the example aspects as described in the paragraphs above, the optimization of the sleep modes is based on determined QoS requirements of traffic that the plurality of network nodes are serving, and the QoS requirements are determined based on at least one of downlink buffer conditions and uplink resource requests of each of the plurality of network nodes.

In accordance with the example aspects as described in the paragraphs above, the information of the determined at least one pattern of the time periods indicates time instances which relate to at least one of sleep periods for links between the plurality of network nodes, and sleep periods of the plurality of network nodes themselves.

In accordance with the example aspects there is a non-transitory computer-readable medium storing program code, the program code executed by at least one processor to perform the operations as at least described in the paragraphs above.

In accordance with the example aspects of the invention there is an apparatus comprising: means for receiving from a plurality of network nodes, information of sleep mode plans of each of the plurality of network nodes; means for determining at least one pattern of time periods of the plurality of network nodes that can be used to optimize the sleep mode plans to provide a highest power savings at the plurality of network nodes; and means for sending towards the plurality of network nodes information of the determined at least one pattern of time periods to use to optimize the sleep mode plans to provide the highest power savings at the plurality of network nodes.

In accordance with the example aspects of the invention as described in the paragraph above, the determined at least one pattern of time periods sent towards the plurality of network nodes comprises at least one pattern of discontinuous reception time periods to be used by the plurality of network nodes for the optimized sleep mode plans.

In accordance with the example aspects of the invention as described in the paragraphs above, the information of sleep mode plans is received from each of the plurality of network nodes via a self-backhaul link.

In accordance with the example aspects of the invention as described in the paragraphs above, the determining comprises negotiating the time periods for sleep mode plans with at least one of the plurality of network nodes.

In accordance with the example aspects of the invention as described in the paragraphs above, the negotiating is performed using the self-backhaul link.

In accordance with the example aspects of the invention as described in the paragraphs above, the negotiating is using information elements for coordinated discontinuous transmission mode configuration of the plurality of network nodes.

In accordance with the example aspects of the invention as described in the paragraphs above, the received information of sleep mode plans comprises at least one of sleep mode configurations and sleep mode patterns of the plurality of network nodes.

In accordance with the example aspects of the invention the optimization of the sleep modes is based on determined QoS requirements of traffic that the network nodes are serving, and the QoS requirements are determined based on at least one of downlink buffer conditions and uplink resource requests of each of the plurality of network nodes.

In accordance with the example aspects as described in the paragraphs above, information of the determined at least one pattern of the time periods indicates time instances which relate to at least one of sleep periods for links between the plurality of network nodes, and sleep periods of the plurality of network nodes themselves.

In accordance with the example aspects of the invention, the means for receiving, means for determining, and means for sending comprises a network interface, and computer program code stored on a computer-readable medium and executed by at least one processor.

In accordance with the example aspects of the invention there is an apparatus, such as a user side apparatus, comprising: at least one processor; and at least one memory including computer program code, where the at least one memory and the computer program code are configured, with the at least one processor, to cause the apparatus to at least: send towards a network device, information comprising sleep mode plans of at least one user equipment; negotiate with the aggregation node time periods for the sleep mode plans to determine at least one pattern of time periods that can be used to optimize the sleep mode plans of the at least one user equipment to provide a highest power savings to the at least one user equipment; and receive from the network device information of the at least one pattern of time periods to use to provide the highest power savings to the at least one user equipment.

In accordance with the example aspects of the invention there is a method comprising: sending, by user side apparatus, towards a network device, information comprising sleep mode plans of at least one user equipment; negotiating, by the network node, with the aggregation node time periods for the sleep mode plans to determine at least one pattern of time periods that can be used to optimize the sleep mode plans of the at least one user equipment to provide a highest power savings to the at least one user equipment; and receiving, by the network node, from the network device information of at least one pattern of time periods to use to provide the highest power savings to at least one user equipment.

In accordance with the example aspects as described in the paragraphs above, the determined at least one pattern of time periods sent towards the plurality of network nodes comprises at least one pattern of discontinuous reception time periods to be used by the plurality of network nodes for the optimized sleep mode plans.

In accordance with the example aspects as described in the paragraphs above, the information of sleep mode plans is received from each of the plurality of network nodes via a self-backhaul link.

In accordance with the example aspects as described in the paragraphs above, the determining comprises negotiating the time periods for sleep mode plans with at least one of the plurality of network nodes.

In accordance with the example aspects as described in the paragraphs above, the negotiating is performed using the self-backhaul link.

In accordance with the example aspects as described in the paragraphs above, the negotiating is using information elements for coordinated discontinuous transmission mode configuration of the plurality of network nodes.

In accordance with the example aspects as described in the paragraphs above, the received information of sleep mode plans comprises at least one of sleep mode configurations and sleep mode patterns of the plurality of network nodes.

In accordance with the example aspects as described in the paragraphs above, the optimization of the sleep modes is based on determined QoS requirements of traffic that the user side apparatus is serving; and the QoS requirements are determined based on at least one of downlink buffer conditions and uplink resource requests of the apparatus.

In accordance with the example aspects as described in the paragraphs above, the information of the optimized at least one pattern of the time periods indicates time instances which relate to at least one of sleep periods for links with the network device, and sleep periods of the network node itself.

In accordance with the example aspects, there is a non-transitory computer-readable medium storing program code, the program code executed by at least one processor to perform the operations as described in the paragraphs above.

In accordance with the example aspects of the invention there is an apparatus comprising: means for sending towards a network device, information comprising sleep mode plans of at least one user equipment; means for negotiating with the aggregation node time periods for the sleep mode plans to determine at least one pattern of time periods that can be used to optimize the sleep mode plans of the at least one user equipment to provide a highest power savings to the at least one user equipment; and means for receiving from the network device information of the at least one pattern of the time periods to use to provide the highest power savings to the at least one user equipment.

In accordance with the example aspects as described in the paragraphs above, the optimization of the sleep modes is based on determined QoS requirements of traffic that the apparatus is serving, and the QoS requirements are determined based on at least one of downlink buffer conditions and uplink resource requests of the apparatus.

In accordance with the example aspects as described in the paragraphs above the negotiating is performed over a control plane interface with the network device; the negotiating is using information elements for coordinated discontinuous transmission mode configuration; and/or the information of the optimized at least one pattern of the time periods indicates time instances which relate to at least one of sleep periods for links with the network device, and sleep periods of the network node itself.

In accordance with the example aspects of the invention, the means for sending, means for negotiating and determining, and the means for receiving comprises a network interface, and computer program code stored on a computer-readable medium and executed by at least one processor.

In accordance with the example aspects there is a communication system comprising the network side apparatus and the user side apparatus as described above.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose a novel method to coordinate sleep mode cycle configurations between 5G radio access points and backhaul aggregation points of a communications network.

Figure 1A:
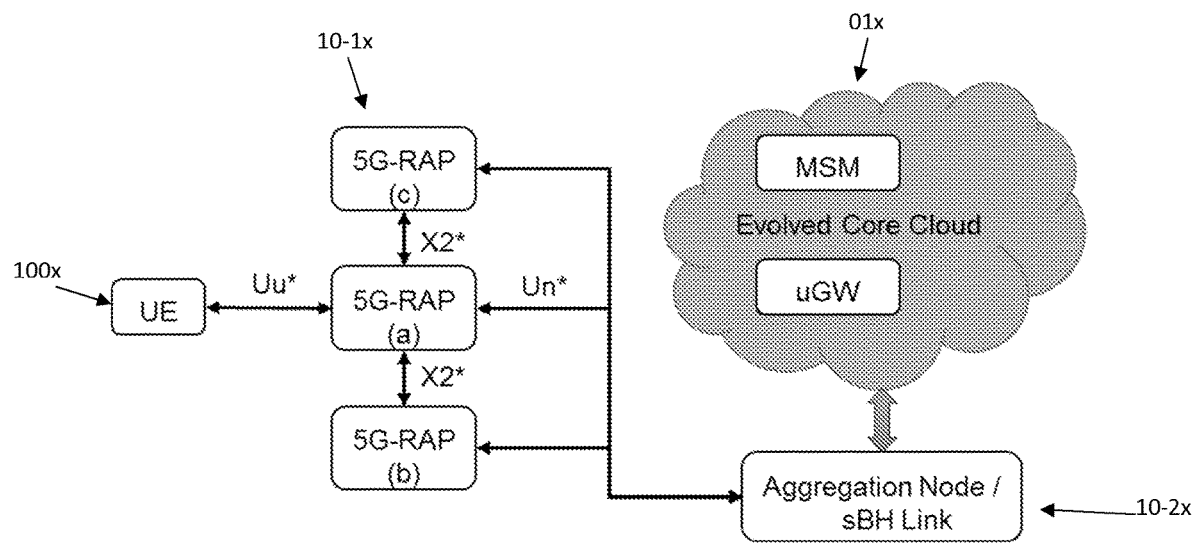
FIG. 1A shows an overall 5G architecture that the example embodiments of the invention can benefit.

The available state-of-the-art considers DRX as something that is determined by the eNB as the controlling transmit-receive node in charge of scheduling. In a hierarchical node architecture intended to define hierarchical node architecture or hierarchical telecommunications network or both, as shown in FIG. 1A. The different nodes have view over different levels of information, for example an eNB can obtain information about data in DL buffers and UL Buffer Status Reports (BSRs) from UEs and aggregation node. In addition, a self-backhauling (sBH) link can provide information about DL traffic from core network and UL BSRs from eNBs. For this matter, how efficient coordinated sleep modes could be enabled by different nodes in the network has currently received no or limited attention. It is noted that a self-backhauling can be defined as when the access and a backhaul (e.g., eNB-eNB or eNB-Network) link share the same communication channel (e.g., wireless channel). These sharing options of the communication channel can be based on time, frequency, and/or space. The example embodiments of the invention work to use sBH technology combined with the potential of an open fronthaul in 5G to provide sleep mode improvements to achieve challenging 5G energy efficiency targets. Open fronthaul may be considered as interface between a higher aggregation layer and a lower aggregation layer. The higher aggregation layer could consist of a fixed set of functionalities, depending on the levels in the protocol stack that are implemented in that node, starting from the Packet Data Convergence Protocol (PDCP) layer. The lower aggregation layer would start from the layer-1 or physical layer. Depending on the level of coordination that is intended between the higher and lower aggregation layers, and the capabilities of the fronthaul, the open fronthaul could connect different protocol stack layers.

In a hierarchical telecommunications networks, the backhaul portion of the network comprises intermediate links between the core network (or BH network) and small subnetworks at the "edge" of the entire hierarchical network. The backhaul is required to carry packets to and from that core network. In the growth of 5G, the dense deployment of 5G-RAPs providing high capacity backhaul (BH) portions will dominate the access network power consumption. Particularly, the backhaul link power consumption, apart from the power consumed by the access network, will require an increased amount of power such that enabling sleep mode coordination between the 5G-RAPs and the backhaul aggregation points will become essential. As these types of backhaul portion devices currently do not coordinated sleep mode operations with the 5G-RAPs, such a sleep mode coordination would provide a significant benefit to improve power consumption of these backhaul portion devices.

The higher data rates and ultra-reliable communication requirements of fifth generation (5G) is expected to be satisfied using an ultra-dense deployment of 5G-Radio Access Points (5G-RAPs). The 5G-RAPs are expected to support higher bandwidths in order to support extreme mobile broadband use cases and is also expected to operate at higher frequency bands (centimeter/millimeter wave, cmW/mmW) where such higher bandwidths would be available. Having such dense deployment of 5G-RAPs and related backhaul links would lead to a significant increase in the network power consumption, which should be avoided.

It is noted that operations in accordance with the example embodiments as included herein can make use of at least control and user plane operations as at least described for example in 3GPP 36.300, "Technical Specification Group Radio Access Network; Evolved Universal Terrestrial Radio Access (E-UTRA) and Evolved Universal Terrestrial Radio Access Network (E-UTRAN); Overall description; Stage 2" strategies for facilitating this growth include user plane and control modification.

FIG. 1A shows an overall 5G network architecture which may be used to perform operations in accordance with the example embodiments. As shown in FIG. 1A there is an Aggregation/self-backhauling (sBH) node between an Evolved Core Cloud 01x (also denoted as an core network 01 of FIG. 2 comprising control plane nodes and the radio access network) and several 5G radio access point (5G-RAP) nodes. These 5G-RAP nodes each communicate with the Evolved Core Cloud via a Un* (backhaul link) and the 5G-RAPs communicate with the UE using a radio access link (*Uu). It is noted that the backhaul link (Un) between the 5G-RAP and the Aggregation Node, and the *Uu between the 5G-RAP and the UE may operate on different frequencies or on the same frequency. In addition, as shown in FIG. 1A, each of the 5G-RAPs have an X2 interface (X2*) connection with the other 5G-RAPs.

Figure 1B:
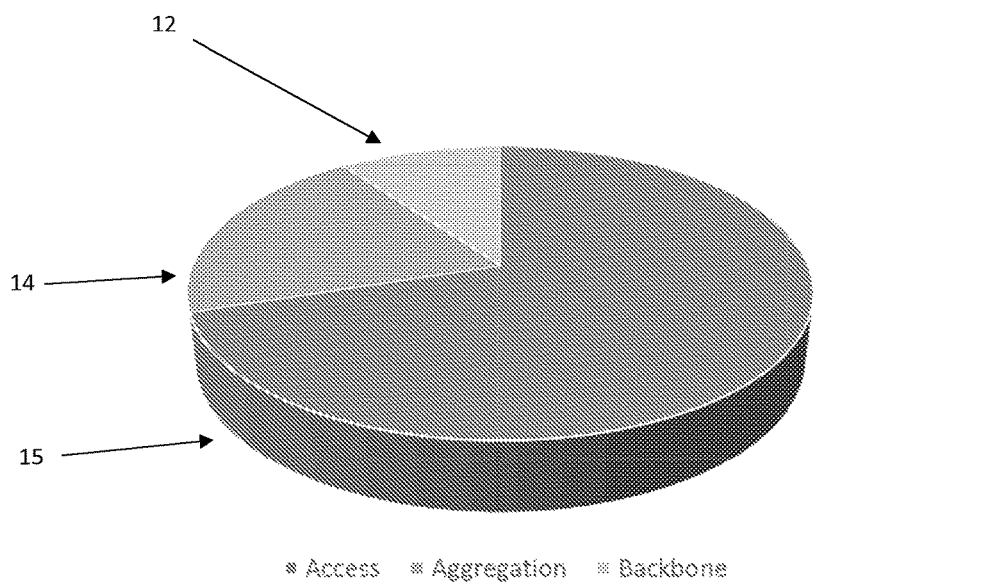
FIG. 1B shows a share of power consumption by various backhaul link types.

The example embodiments of the invention relate to joint radio access network backhaul (RAN-BH) optimizations from an LTE system perspective, in terms of power saving potentials. While no specific solutions have been proposed, the potential and need for such mechanisms is clear. The current share of power consumption by the access, aggregation and backbone BH links are as shown in FIG. 1B. As shown in FIG. 1B the BH aggregation portion 14 of a 5G network is responsible for about 20% of the total power consumption. The Access portion 15 about 70%, and the remaining smaller portion of the total power about 10% is used by the backbone portion 12 of the 5G network. From this figure it can be seen that the access backhaul links even today (with homogeneous network considerations) dominate the backhaul link consumption and this trend is expected to continue and even accentuate in 5G-Ultra Dense Network deployments.

Figure 2:
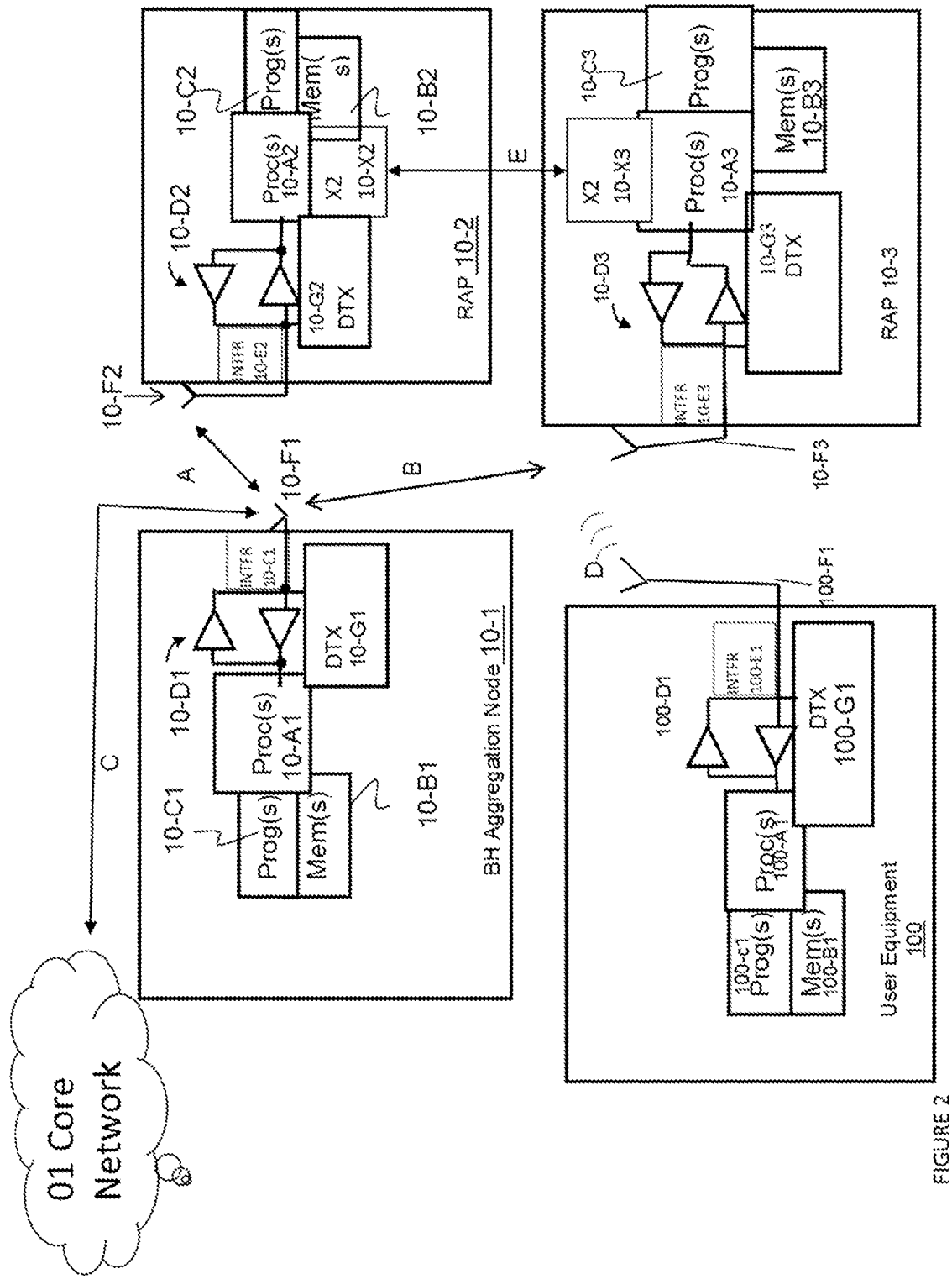
FIG. 2 shows a high level block diagram of various devices used in carrying out various aspects of the invention.

Before discussing the invention in detail, reference will be made to FIG. 2. FIG. 2 illustrates an overview of one environment where the example embodiments of the invention may be practiced. FIG. 2 is a block diagram having a number of devices. In accordance with the example embodiments of the invention, communications between devices, such as the devices in FIG. 2, can include direct communication, communication via another device that is connected to a network such as via Core Network 01 of FIG. 2 or the Evolved Core Cloud 01x of FIG. 1A. The Core Network 01 may include connectivity to a network, such as for example a cellular network, via a direct link, via a base station, via a modem, via satellite, via a gateway, and/or via an Internet connection. In addition, any part or all of these communications and novel operations may be offloaded to a 3rd party network or device. Further, in accordance with the example embodiments the novel operations as disclosed herein can be performed by devices associated with a same network or different networks.

The BH Aggregation Node 10-1 includes one or more processors 10-A1, one or more memories 10-B1 containing one or more programs 10-C1, a radio frequency transceivers 10-D1 able to receive and transmit data, an interface 10-E1, and one or more antennas 10-F1. In accordance with the example embodiments the interface 10-E1 is configured to provide a connection with RAP devices such as the RAP 10-2 and the RAP 10-3 as in FIG. 2. Further, the interface 10-E1 is configured to communicate with the Core Network 01 over connection "C".

The RAP 10-2 as shown in FIG. 2 includes one or more processors 10-A2, one or more memories 10-B2 containing one or more programs 10-C2, a radio frequency transceiver 10-D2 able to receive and transmit data, an interface 10-E2, and one or more antennas 10-F2. The interface 10-E2 is configured to operate as a wired and/or wireless interface, for communication with the core network via the BH aggregation Node 10-1 as shown with connection "A". In accordance with the example embodiments the interface 10-E2 is configured to provide a connection "A" with both, the BH Aggregation Node 10-1 and with user equipment such as the User Equipment 100. In addition it is noted that the addition of the X2 10-X2 interface is not limiting, and this X2 interface may not be configured at this or any other device. The 10-X2 interface may be used for X2 communication "E" with other RAP, such as the RAP 10-3. Connection A and B indicate the link between the radio access point and the backhaul aggregation node, which could be a self-backhaul node as well. For the RAP-sBH link, A and B could be similar to an enhanced Uu interface available in LTE-Advanced network. The link could be a transport link between the radio access network and the backhaul aggregation point as well. 10-E2 could be a forwarding unit, and essentially does not provide additional functionality, in case of a regular backhaul and could use the same interface as a UE to send the packets to the sBH node as well.

Similarly, the RAP 10-3 as in FIG. 2 includes one or more processors 10-A3, one or more memories 10-B3 containing one or more programs 10-C3, a radio frequency transceiver 10-D3 able to receive and transmit data, an interface 10-E3, and one or more antennas 10-F3. The interface 10-E3 is configured to operate as a wired and/or wireless interface, for communication with both, the core network via the BH aggregation Node 10-1 and the user equipment 100 as shown with connection "B". In accordance with the example embodiments the interface 10-E3 is configured to provide the connection "B" with the BH Aggregation Node 10-1 and with user equipment such as the User Equipment 100. In addition it is noted that the addition of the X2 10-X3 interface is not limiting. It is noted that the 10-X3 interface is configured to perform X2 communication operations and X2 communications "E" with other RAP such as the RAP 10-2 via the 10-X3 interface.

Further, the RAP 10-2 and the RAP 10-3 of FIG. 2 also includes DTX processors 10-G1 and 10-G3, respectively. The DTX processors 10-G2 and 10-G3 are each configured to at least perform the novel DTX signaling and configuration and operation. It is noted that DTX can be synonymous with sleep mode for eNB, whereas DRX is synonymous with sleep mode for UE. Since some example embodiments relate to self-backhaul embodiments, DTX would indicate sleep mode for the 5G-NB/RAP acting as sBH node, whereas the DRX would be applicable to the RAP which is connected to the UE (via the sBH node).

In accordance with the example embodiments, a communicated sleep mode configuration would identify sleep cycles, sleep decisions, and/or sleep modes that are set to be implemented by the device. In accordance with the example embodiments the sleep mode configuration can also include any of DTX and/or DRX information. Such configuration information may include any one or more of DTX offset information, short DRX cycle information, long DRX cycle information, DRX short cycle timer information, on duration timer information, and DRX retransmission timer information. Any of this information can be used to coordinate sleep cycles between devices as in accordance with the example embodiments of the invention.

In accordance with the example embodiments of the invention. In accordance with the example embodiments the BH Aggregation Node 10-1 can include a DTX processor 10-G1 to coordinate DTX cycles. In addition, the RAP 10-2 and RAP 10-3 can include DTX processors 10-G2 and 10-G3, respectively, to also coordinate DTX cycles with another device in accordance with the example embodiments of the invention. Further, as illustrated there may be a wired and/or wireless connections established between any of the devices of FIG. 2. Any of these connections may be used for communications of novel signaling and information exchange in accordance with the example embodiments of the invention.

The User Equipment 100 as in FIG. 2 includes one or more processors 100-A1, one or more memories 100-B1 containing one or more programs 100-C1, a radio frequency transceiver 100-D1 able to receive and transmit data, an interface 100-E1, and one or more antenna 100-F1. The interface 100-E1 is configured to operate as a wireless interface, also referred to as an air interface for communication over-the-air with other device(s), such as the RAP 10-2, RAP 10-3, and/or other devices or user equipment. This wireless interface is not limiting and the User Equipment 100 may use a wired connection as well from the interface 100-E1 for communications "D". Further, the User Equipment 100 also includes a DTX processor 100-G1. In accordance with the example embodiments of the invention, the DTX processor 100-G1 is configured to at least perform the novel DTX/DRX signaling and configuration and operations in accordance with the example embodiments of the invention. The User Equipment 100 can be any mobile equipment such as a cellular phone or other cellular device, or a device such as a PDA or laptop.

It is noted that the connections "A" and "B" between the RAPs 10-2 and 10-3 and the BH Aggregation Node 10-1 as shown in FIG. 2 can comprise LTE "Un" Backhaul links. Also the X2 interface connection "E" may serve as a Backhaul link. Further, the connection "D" as between the RAPs 10-2 and 10-3 and the user equipment 100 can comprise an LTE "Uu" link. Further, as similarly stated above the backhaul link (Un) between the RAPs 10-2 and/or 10-3 and the Aggregation Node 10-1, and the *Uu between the RAPs 10-2 and/or 10-3 and the UE 100 may operate on different frequencies or on the same frequency.

In addition, it is noted that at least any of the connections "A", "B", "C", "D", and/or "E" as in FIG. 2 may comprise wired and/or wireless links. Further, any of the connections "A", "B", "C", "D", and/or "E" may comprise connections to one or more intermediary nodes such that at least one intermediary node is used to enable the communications over these connections. Such an intermediary node may comprise at least one base station, eNB, relay, access-point, switch and/or another device.

The example embodiments of the invention provide a novel method for coordinating between 5G-RAPs sleep cycles and their durations, sleep decisions, and/or sleep modes. In LTE, when there is no data to receive or transmit in a connected mode, a device, such as a UE or other network device, would switch off its transceiver for a predetermined interval, thus implementing sleep cycles. These sleep cycles or sleep period periods will improve the battery savings. Then, after this interval the device may wake up or implement a wake up period. During the wake up period, the device will keep monitoring uplink and/or downlink channels for traffic such as but not limited to UL or DL grants. In accordance with the example embodiments of the invention, information of sleep mode plans, including at least sleep mode configurations and sleep cycle plans, are coordinated between RAPs using a backhaul node. In accordance with the example embodiments each 5G-RAP will independently determine its sleep cycle duration or pattern e.g., which subframes within a radio frame, etc. could be the sleep mode. In accordance with an example embodiment a sleep mode configuration of a device, such as of a RAP and/or UE, could be exchanged over an interface, such as an X2 interface.

In accordance with the example embodiments, the backhaul aggregation point considers various sleep strategies, including deactivating independent backhaul links and a complete 5G-RAP-BH aggregation node deactivation, in order to achieve energy savings. These operations consider at least one of the following:

Various factors including the QoS of the established service flows;

Downlink buffer conditions and Uplink resource requests from a 5G-RAP (e.g., at the BH aggregation node);

Various asynchronous sleep cycles adopted by the distributed 5G-RAPs;

The potential for power savings by coordinating the sleep cycles between the 5G-RAPs, considering:

Potential impact on the traffic served by the 5G-RAPs

Mobility impacts and discoverability of the RAPs.

It is noted that in accordance with the example embodiments of the invention, fewer or a subset of these operations may be performed based on what is practically feasible for a backhaul aggregation point. Further, in accordance with the example embodiments of the invention, asynchronous sleep cycles could be indicated, for example, in the radio frame for normal operation as shown on the top of FIG. 3. In this type of situation each RAP determines the sleep mode independently fewer or a subset of these operations may be performed based on what is practically feasible for a backhaul aggregation point.

General Operations:

In accordance with the example embodiments, the 5G-RAP, such as the RAP 10-2 and/or RAP 10-3 of FIG. 2, informs the backhaul node (e.g., the BH aggregation Node 10-1 of FIG. 2) about the intended sleep mode plan and about the time periods where it would be in sleep mode. In accordance with the example embodiments this would be required for the backhaul node to adjust the scheduling of downlink data from the core network accordingly. If the backhaul node is a dedicated backhaul link for the RAP, the backhaul node enters sleep mode, which is perfectly synchronized with the RAP. In accordance with an example embodiment of the invention, a dedicated backhaul link can be implemented point-to-point via an air interface or cable.

It is noted that for a case a dedicated backhaul link is implemented via air interface, it may be over the sBH link, whereas if a dedicated backhaul link is implemented using cable this may be a proprietary implementation, such as determined by a network operator.

This would be essential in the fast wake up of the RAP and avoiding further re-synchronization procedure from the RAP, which can significantly reduce the amount of wake-up delay. Here the key idea is that since the 5G-RAP-BH link is essentially a stable link (both RAP and BH node are static, achieving synchronicity through this technique would avoid any unnecessary delays. Such a technique can be referred to as a fast wakeup technique. Potential enhancements could be applied over moving RAPs in 5G (using different UEs or different categories of UEs which require achieving synchronization again with the backhaul node).

Figure 3:
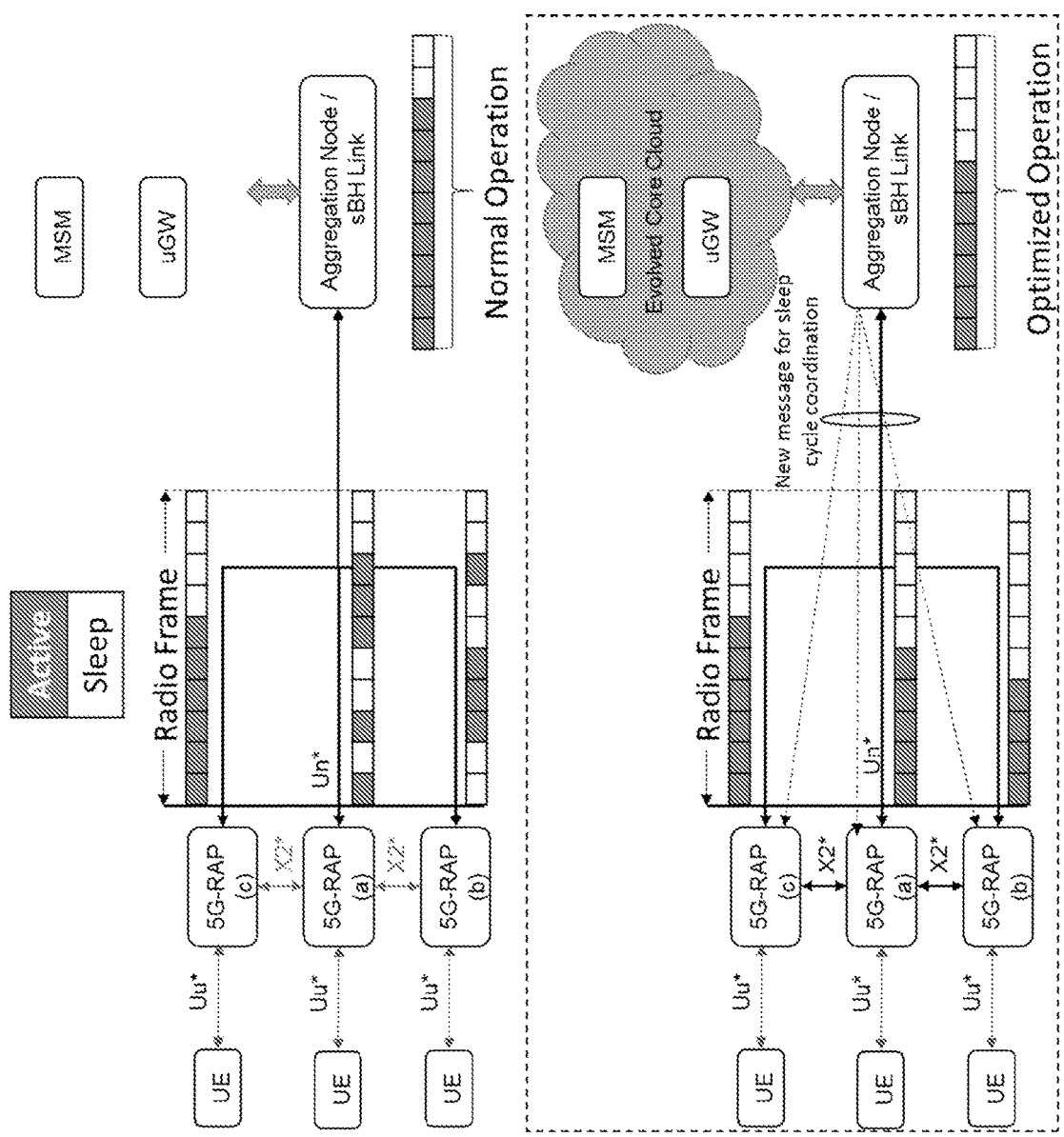
FIG. 3 shows an operation diagram of a coordinated RAN-BH active/sleep mode.

A simple diagram illustrating normal operations and an optimized operations in accordance with the example embodiments of the invention is as shown in FIG. 3. As shown in the normal operations in the top section of FIG. 3 the sleep mode operations (e.g., sleep mode plans) are occurring in different portions of the radio sub-frame (e.g., pattern of time and/or time periods), and in some instances as shown there are multiple shorter sleep time portions (e.g., DTX subframes) for different BH nodes. Whereas, as shown the optimized operations at the bottom of FIG. 3 the example embodiments of the invention work to coordinate and improve the sleep mode timings or sleep mode plans, synchronisation, coordination, configuration, and/or negotiation.

As shown in the bottom of FIG. 3, new messages for sleep cycle coordination are defined for coordinating the sleep cycles (e.g., sleep mode plans) between the RAPs (e.g., RAP 10-2 and/or RAP 10-3 of FIG. 2). Assuming a fixed set of configurations are available for the RAP sleep modes, where DTX subframes are indicated to the UE (e.g., the User Equipment 100 via connections B, C, and/or D of FIG. 2) using a new signalling message for radio resource control (RRC), UEs such as 5G-UEs are configured with the DRX configuration when the RAP enters DTX mode. The DTX mode of RAP is negotiated between RAP and BH node. In a non-limiting example, this DTX mode can be using a coordinated DTX mode configuration.

If the BH node (e.g., BH Aggregation Node 10-1 of FIG. 2) is a sBH node, then this negotiation occurs over the control plane interface between the RAP and sBH link. If the BH node is a proprietary node, then this information exchange occurs over an implementation specific interface. Such a proprietary interface can include a closed, vendor specific, and/or implementation-specific interface.

Figure 4:
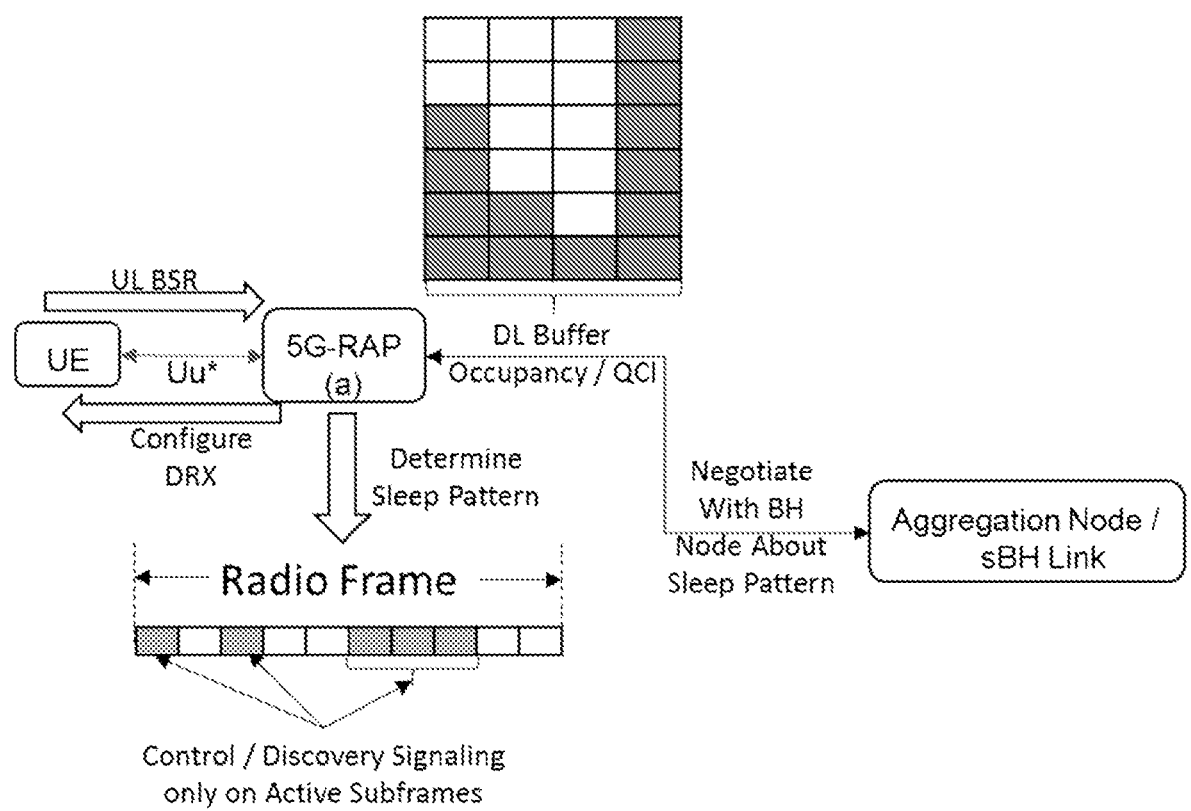
FIG. 4 shows 5G-RAP Operation During Low Load Conditions.

Detailed Operation:

The eNB operation in accordance with an example embodiment is shown in FIG. 4. Based on the evaluations done on the DL buffer, with various QoS Class Identifiers (QCIs) requiring different priority and handling, and based on the UL BSRs, the 5G-RAP determines the sleep mode pattern it can support for energy efficiency, while supporting the QoS requirements of the traffic that it is serving. The eNB then sends this information to the BH aggregation node or sBH link. If the RAP has a dedicated BH link/node, then the BH node also follows the same sleep mode pattern as the RAP in order to achieve high energy savings. If the BH node is serving multiple RAPs, then it evaluates the various potential patterns and negotiates with the RAPs to select the pattern, which enables the highest amount of power savings at the BH node. It is noted that the above approach or operations as well as the other operations as described herein can be performed using wireline, wireless, and/or wired connected interfaces (e.g., interface 10-E1, 10-E2, 10-E3, and/or 100-E1 as in FIG. 2), requiring the implementation-specific interface between the RAP (e.g., RAP 10-2 and/or RAP 10-3 as in FIG. 2) and a BH aggregation node (e.g., BH Aggregation Node 10-1 of FIG. 2) to enter sleep mode in a synchronous manner. Here the wireline interface can be switched on and off, according to the operational state of the RAP node.

Such negotiation could be done depending on the QoS of the active traffic, minimizing the potential delay that the energy saving actions could cause. There could also be preconfigured energy saving targets at the 5G-RAPs depending on the time-of-day, location, etc. Once the control plane signalling is done, and the sleep mode patterns are finalized, the DRX configurations or sleep mode pattern/plan configurations are done on the UE, in order to synchronize the sleep cycles between all the nodes involved in the network. As described herein, the pattern could be the actual pattern in terms of sleep mode subframes used, and configuration could be the information that could be exchanged over an interface.

The RAP could reject the sleep mode reconfiguration request from the aggregation node if the additional delay involved would affected the QoS of the served traffic. Another criteria for the configuration accepting/rejecting could be the control/discovery signalling periodicity of the RAP or RAB (keep alive message within radio access bearer RAB of chat application). Since the sleep modes are assumed to be configured based on the RAP dependent discovery and control signalling periodicity, the synchronization of sleep signals should not affect this mechanism, since it would have impacts on the mobility and discoverability of the RAP.

Figure 5:
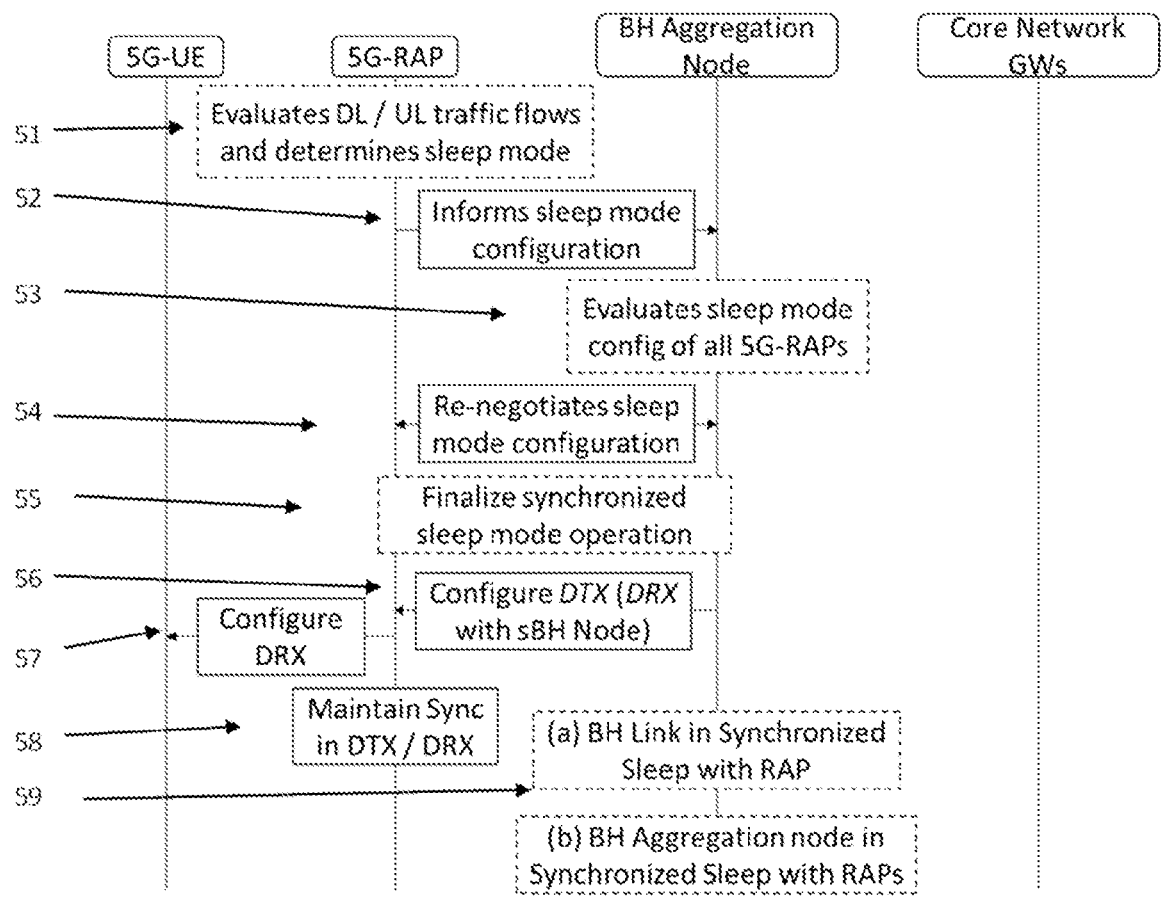
FIG. 5 shows an example signalling diagram for operations in accordance with an example embodiment of the invention.

FIG. 5 shows an example signalling diagram related to how the coordinated sleep mechanism could work. It is noted that FIG. 5 relates to operations of a 5G-UE and a 5G-RAP(s). However, it is noted that these devices may be using another or different radio technology, e.g., 4G etc. Thus, the 5G designation of these devices in FIG. 5 is for mere informational purposes and is non-limiting.

Here, as shown in step 51 of FIG. 5, the RAP (e.g., RAP 10-2 and/or RAP 10-3 of FIG. 2) first determines (e.g., processors 10-A2, 10-G2, 10-A3, and/or 10-G3 of FIG. 2) the sleep cycles, for example sleep mode pattern of time and/or time periods, (active and inactive subframe DTX subframes of paragraphs [70, 71], sleep cycle=sequence of inactive DTX subframes. Sleep mode pattern determined considering the RAP traffic) depending on the real-time traffic and optionally configures the control and discovery signals accordingly. Here, all RAP traffic is considered and the sleep mode pattern can be determined based on the traffic type and other criteria. For example the RAP can sleep if the data it has to send or receive has a tolerable level of delay.

Then as shown in step 52 the RAP informs (e.g., via connections A, B, C, D, and/or E of FIG. 2) the BH aggregation node (e.g., BH Aggregation Node 10-1 of FIG. 2) regarding the sleep mode planned or sleep mode plans to be adopted. As shown in step 53 of FIG. 5 the BH aggregation node evaluates (e.g., processors 10-A1 and/or 10-G1 of FIG. 2) the sleep mode configuration of all the 5G-RAPs and at step 54 renegotiates (e.g., processors 10-A1 and/or 10-G1 and connections A, B, C, D, and/or E of FIG. 2) the sleep mode or sleep mode plans to synchronize the operation between all the 5G-RAPs served by the BH Aggregation node, in order to achieve higher power savings. In accordance with the example embodiments the feedback can relate to a multitude of RAPs, as indicated in FIG. 3 where 3 RAPs are involved.

Once as shown in step 55 the sleep modes are finalized as an option a fixed set of configuration modes may be defined in order to simplify the new signalling information elements and reduce signalling overhead and processing, the 5G-RAP informs the UEs (e.g., the User Equipment 100 via connections B, C, and/or D of FIG. 2) regarding the sleep mode configuration information (e.g., sleep mode plans and/or pattern of time periods). In accordance with an example embodiment the BH aggregation node provides the best sleep mode configuration which enable the RAPs to maximize the amount of sleep and also allow the BH aggregation node to sleep in subframes where all RAPs are sleeping. As shown in the optimized operation part of FIG. 3, e.g., in the last 4 subframes of the radio frame, the BH aggregation node can also sleep, since there are no transmissions coming from any of the RAPs. At step 56 the DTX configuration based on the finalized sleep mode configurations BH aggregation node has sleep mode configuration info which determines the DTX configuration of the RAP and UE is determined and is sent to the 5G-RAP(s), which are then sent to the 5G-UE as shown in step 57. It is noted that this operation i.e. the step 57, is optional, if the UEs are static (for example in massive MTC scenario), since re-sync operation could be avoided. Then as shown in step 58 the 5G-RAP maintains a synchronization with the finalized DTX/DRX configuration at the 5G-UE. In normal operation, when the UE is configured with DRX and may be moving around, the UE needs to resynchronize with the cell after exiting the DRX mode. In accordance with the example embodiments, there is an option where RAP-BH link(s) and UE-RAP link(s) can be static. This is such that an additional sync step can be avoided, which would reduce the connection reestablishment delay.

Step 59 of FIG. 5 shows that at least one of the BH link e.g., option (a) and the BH aggregation node e.g., option (b) sleep modes are synchronized in accordance with the embodiments.

Figure 6:
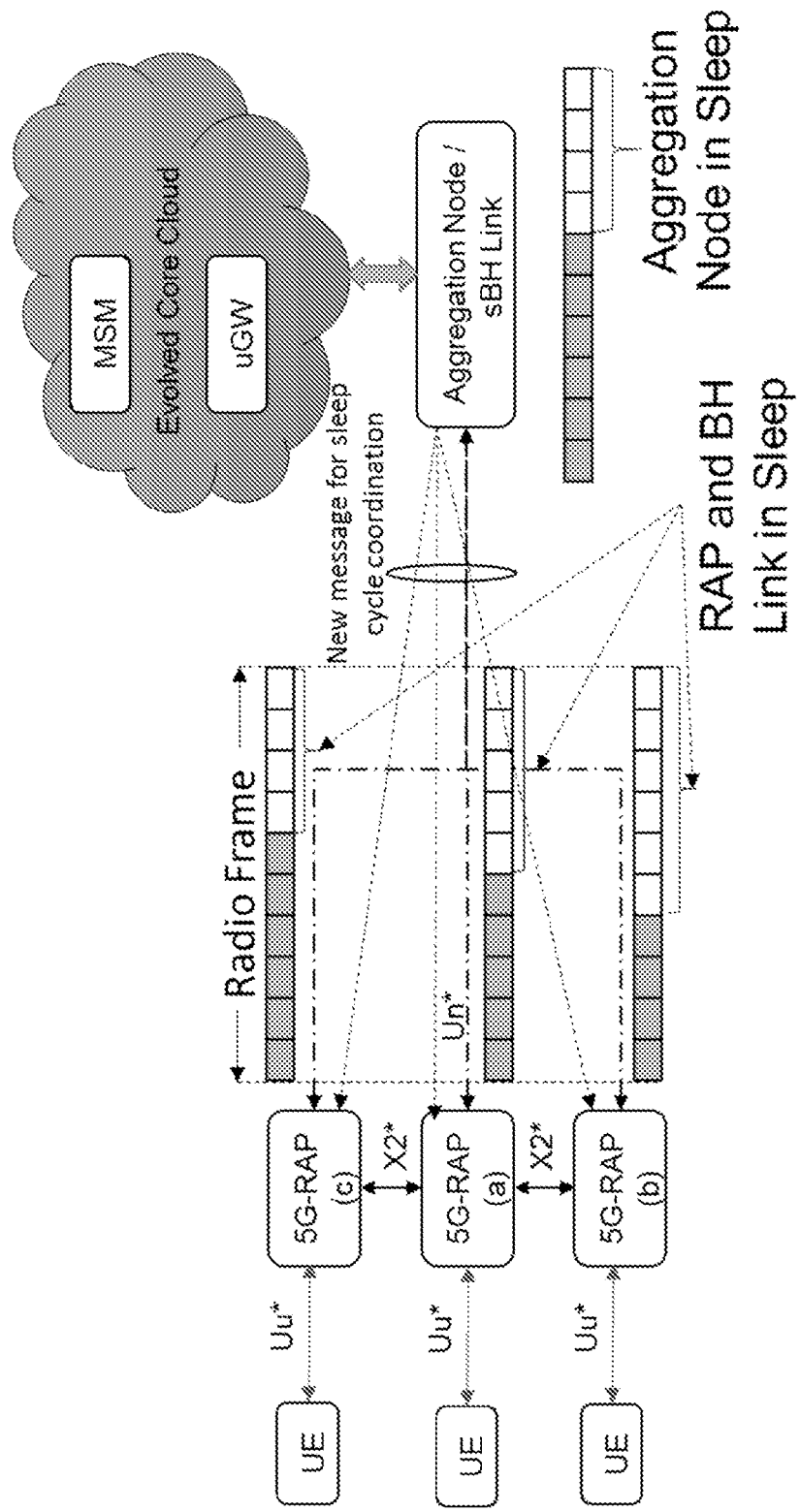
FIG. 6 shows a coordinated sleep operation in accordance with an example embodiment of the invention.

FIG. 6 shows a coordinated sleep operation, which could be considered as DTX from the 5G-RAP perspective. When the 5G-RAP (e.g., RAP 10-2 and/or RAP 10-3 of FIG. 2) is connected to the core network using a sBH link (e.g., connections A, B, and/or C as in FIG. 2), the DTX configuration that the 5G-RAP would like to adopt (sleep mode plan) would be seen as a DRX request from the sBH node perspective, since the 5G-RAP appears as a UE to the sBH node. Based on the DRX request from multiple 5G-RAPs, the sBH node can configure the coordinated DRX mode for the 5G-RAP. The DRX configuration here would indicate the finalized sleep mode configuration (e.g., sleep mode pattern of time and/or time periods), that the 5G-RAP can adopt. With a regular backhaul interface, the sleep mode plan of the 5G-RAP would be sent as a DTX configuration request to the backhaul aggregation link, and the backhaul aggregation node can provide the optimized finalized sleep mode configuration based on the requests from multiple 5G-RAPs in accordance with the example embodiments. In accordance with an example embodiment the RAP (e.g., RAP 10-2 and/or 10-3 of FIG. 2) maintains synchronisation, with the same clock signal, with the sBH/aggregation node (e.g., the BH aggregation Node 10-1 of FIG. 2), since they are both essentially static links. It is assumed that the sBH link provides the negotiated final sleep mode configuration (e.g., at least one pattern of time periods), determined such as in steps 54/55 of FIG. 3, using DTX configuration or DRX of the RAP. This can be assuming that the RAP-sBH link could be similar to the Un link in LTE. Otherwise new information elements for the coordinated sleep mode plan or DTX mode configuration may be signalled to the RAPs, which enables BH link and BH aggregation node (e.g., the BH aggregation Node 10-1 of FIG. 2) sleep modes. Here, an option (a) indicates the time instances where the BH link (e.g., connection A, B, and/or E as in FIG. 2) between the aggregation node and RAP is in sleep mode, synchronized with the RAP sleep cycles. With an option (b), the RAP, related BH link and the BH aggregation node would be in sleep mode, in order to save power.

Figure 7A:
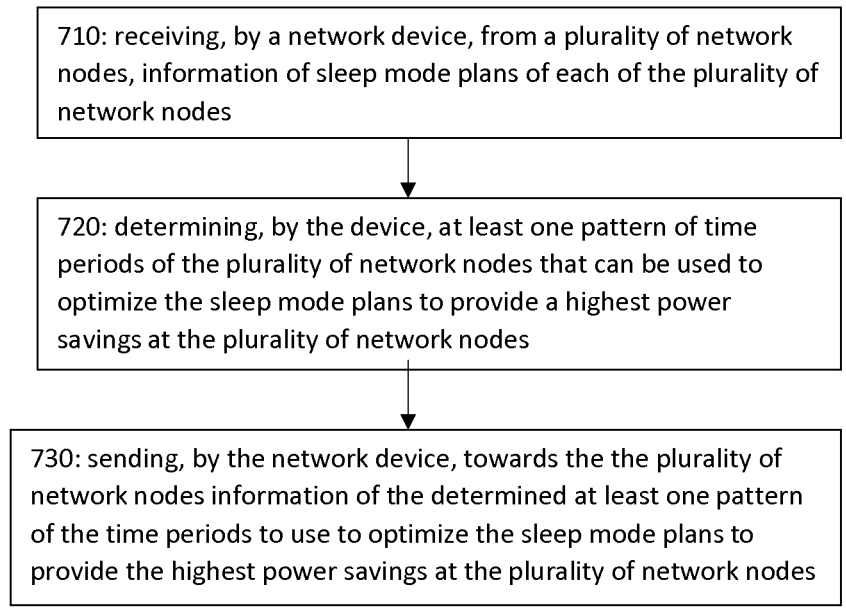
FIGS. 7A and 7B each show a method in accordance with example embodiments of the invention which may be performed by an apparatus.
Figure 7B:
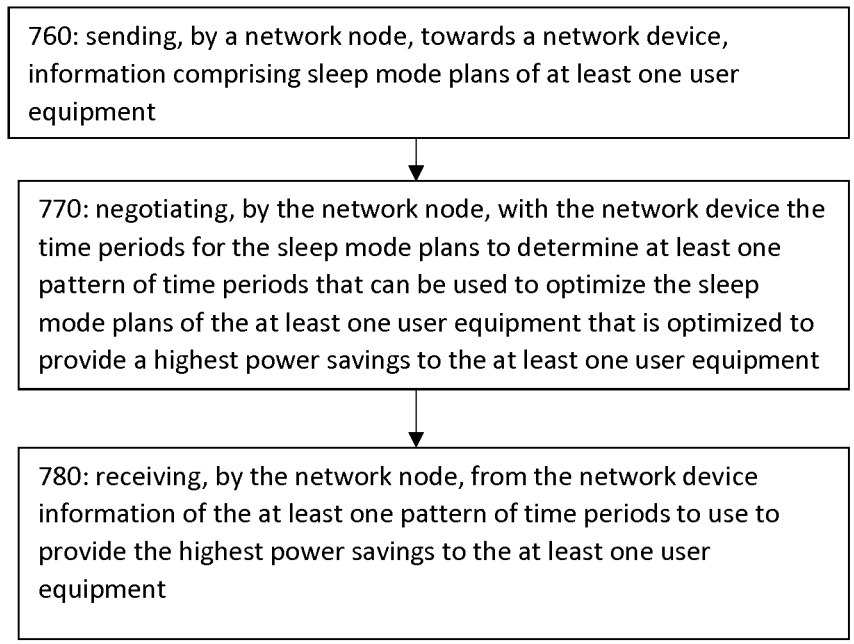

FIGS. 7A and 7B each show a method in accordance with example embodiments of the invention which may be performed by an apparatus.

FIG. 7A illustrates operations which may be performed by a network device such as, but not limited to, the BH aggregation node 10-1 as in FIG. 2 or an eNB for example. As shown in step 710 of FIG. 7A there is receiving, by a network device, from a plurality of network nodes, information of sleep mode plans of each of the plurality of network nodes. As step 720 of FIG. 7 there is determining, by the network device, at least one pattern of time periods of the plurality of network nodes that can be used to optimize the sleep mode plans to provide a highest power savings at the plurality of network nodes. Then as shown in step 730 there is sending, by the network device, towards the plurality of network nodes information of the determined at least one pattern of time periods to use to optimize the sleep mode plans to provide the highest power savings at the plurality of network nodes.

In accordance with the example embodiments as described in the paragraph above, the determined at least one pattern of time periods sent towards the plurality of network nodes comprises at least one pattern of discontinuous reception time periods to be used by the plurality of network nodes for the optimized sleep mode plans.

In accordance with the example embodiments as described in the paragraphs above, the information of sleep mode plans is received from each of the plurality of network nodes via a self-backhaul link.

In accordance with the example embodiments as described in the paragraphs above, the determining comprises negotiating the time periods for sleep mode plans with at least one of the plurality of network nodes.

In accordance with the example embodiments as described in the paragraphs above, the negotiating is performed using the self-backhaul link.

In accordance with the example embodiments as described in the paragraphs above, the negotiating is using information elements for coordinated discontinuous transmission mode configuration of the plurality of network nodes.

In accordance with the example embodiments as described in the paragraphs above, the received information of sleep mode plans comprises at least one of sleep mode configurations and sleep mode patterns of the plurality of network nodes.

In accordance with the example embodiments as described in the paragraphs above, the optimization of the sleep modes is based on determined QoS requirements of traffic that the network nodes are serving.

In accordance with the example embodiments as described in the paragraphs above, the QoS requirements are determined based on at least one of downlink buffer conditions and the uplink resource requests of each of the plurality of network nodes.

In accordance with the example embodiments as described in the paragraphs above, the information of the determined at least one pattern of the time periods indicates time instances which relate to at least one of sleep periods for links with the plurality of network nodes, and sleep periods of the plurality of network nodes themselves.

A non-transitory computer-readable medium (MEM(s) 10-B1 of FIG. 2) storing program code (Prog(s) 10-C1 of FIG. 2), the program code executed by at least one processor (Proc(s) 10-A1 and/or DTX 10-G1 of FIG. 2) to perform the operations as at least described in the paragraphs above.

In accordance with the example embodiments as described above, there is means for receiving (radio frequency transceivers 10-D1, INTFR 10-E1, and one or more antenna 10-F1 of FIG. 2) from each of a plurality of network nodes (RAP 10-2 and RAP 10-3 of FIG. 2), information of sleep mode plans of each of the plurality of network nodes; means for determining (Proc(s) 10-A1 and/or DTX 10-G1; Prog(s) 10-C1, and/or Mem(s) 10-B1 of FIG. 2) at least one pattern of time periods of the plurality of network nodes that can be used to optimize the sleep mode plans to provide a highest power savings at the plurality of network nodes; and means for sending (radio frequency transceivers 10-D1, INTFR 10-E1, and one or more antenna 10-F1 of FIG. 2) towards the plurality of network nodes information of the determined at least one pattern of time periods to optimize the sleep mode plans of the plurality of network nodes to achieve the highest power savings.

In accordance with the example embodiments as described above, wherein at least the means for receiving, means for determining, and means for sending comprises a network interface (INTFR 10-E1 of FIG. 2), and computer program code (Prog(s) 10-C1 of FIG. 2) stored on a computer-readable medium (Mem(s) 10-B1 of FIG. 2) and executed by at least one processor (Proc(s) 10-A1 and/or DTX 10-G1 of FIG. 2).

FIG. 7B illustrates operations which may be performed by a network node such as, but not limited to, the RAP 10-2 and/or RAP 10-3 as in FIG. 2 or a user equipment for example. As shown in step 760 of FIG. 7B there is sending, by a network node, towards a network device, information comprising sleep mode plans of at least one user equipment. As shown in step 770 of FIG. 7B there is negotiating, by the network node, with the network device time periods for sleep mode plans to determine at least one pattern of time periods that can be used to optimize the sleep mode plans of the at least one user equipment to provide a highest power savings to the at least one user equipment. Then as shown in step 780 of FIG. 7B there is receiving, by the network node, from the network device information of the at least one pattern of the time periods to use to provide the highest power savings to the at least one user equipment.

In accordance with the example embodiments as described in the paragraph above, the at least one pattern of time periods comprises at least one pattern of discontinuous reception time periods to be used by the network node for sleep modes of the at least one user equipment.

In accordance with the example embodiments as described in the paragraphs above, the negotiating is performed using a self-backhaul link.

In accordance with the example embodiments as described in the paragraphs above, the negotiating is using information elements for coordinated discontinuous transmission mode configuration by the network node.

In accordance with the example embodiments as described in the paragraphs above, the sent information of sleep mode plans comprises at least one of sleep mode configurations and sleep mode patterns of the at least one user equipment.

In accordance with the example embodiments as described in the paragraph above, the optimization of the sleep modes is based on determined QoS requirements of traffic that the network node is serving.

In accordance with the example embodiments as described in the paragraphs above, the information of the optimized at least one pattern of the time periods indicates time instances which relate to at least one of sleep periods for links between the network node and the network device, and sleep periods of the network node itself.

A non-transitory computer-readable medium (MEM(s) 10-B2 and/or 10-B3 of FIG. 2) storing program code (Prog(s) 10-C2 and/or 10-C3 of FIG. 2), the program code executed by at least one processor (Proc(s) 10-A2 and/or DTX 10-G2 of RAP 10-2; and/or Proc(s) 10-A3 and/or DTX 10-G3 of RAP 10-3 of FIG. 2) to perform the operations as at least described in the paragraphs above.

In accordance with the example embodiments as described above, there is means for sending (radio frequency transceivers 10-D2 and/or 10-D3, INTFR 10-E2 and/or 10-E3, and one or more antenna 10-F2 and/or 10-F3 of FIG. 2) towards a network device (BH Aggregation Node 10-1), information comprising sleep mode plans of at least one user equipment (User Equipment 100); means for negotiating (Proc(s) 10-A2, DTX 10-G2, Proc(s) 10-A3, and/or DTX 10-G3) with the aggregation node time periods for the sleep mode plans to determine (Proc(s) 10-A2, DTX 10-G2, Proc(s) 10-A3, and/or DTX 10-G3) at least one pattern of time periods that can be used to optimize the sleep mode plans of the at least one user equipment that is optimized to provide a highest power savings to the at least one user equipment; and means for receiving (radio frequency transceivers 10-D2 and/or 10-D3, INTFR 10-E2 and/or 10-E3, and one or more antenna 10-F2 and/or 10-F3 of FIG. 2) from the network device information of the at least one pattern of time periods to use to provide the highest power savings to the at least one user equipment.

In accordance with the example embodiments as described above, wherein at least the means for receiving, means for negotiating, determining, and means for sending and receiving comprises a network interface (INTFR 10-E2 and/or 10-E3 of FIG. 2), and computer program code (Prog(s) 10-C2 and/or 10-C3 of FIG. 2) stored on a computer-readable medium (Mem(s) 10-B2 and/or 10-B3 of FIG. 2) and executed by at least one processor (Proc(s)) 10-A2, DTX 10-G2, Proc(s) 10-A3, and/or DTX 10-G3 of FIG. 2).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
    at least one processor; and
    at least one non-transitory memory including computer program code, where the at least one non-transitory memory and the computer program code are configured, with the at least one processor, to cause the apparatus to at least:
        receive via a self-backhaul link from a plurality of network nodes information of sleep mode plans of each the plurality of network nodes;
        determine quality of service requirements of traffic that the plurality of network nodes are serving, wherein the quality of service requirements are determined based on at least one of downlink buffer conditions and uplink resource requests of each of the plurality of network nodes;
        based at least on the determined quality of service requirements of traffic, determine at least one pattern of time periods of the plurality of network nodes indicating time instances where the self-backhaul link is in sleep mode comprising at least one of a sleep period for the self-backhaul link from the plurality of network nodes and sleep periods of the plurality of network nodes themselves that can be used to optimize the sleep mode plans to provide a highest power savings at the plurality of network nodes; and
        send towards the plurality of network nodes information of the determined at least one pattern of time periods to use to optimize the sleep mode plans to provide the highest power savings at the plurality of network nodes.

2. The apparatus of claim 1, wherein the determined at least one pattern of time periods sent towards the plurality of network nodes comprises at least one pattern of discontinuous reception time periods to be used by the plurality of network nodes for the optimized sleep mode plans.

3. The apparatus of claim 1, wherein the self-backhaul link is a self-backhaul link of a backhaul aggregation node.

4. The apparatus of claim 1, wherein the determining comprises negotiating the time periods for sleep mode plans with at least one of the plurality of network nodes.

5. The apparatus of claim 4, wherein the negotiating is performed using the self-backhaul link.

6. The apparatus if claim 4, wherein the negotiating is using information elements for coordinated discontinuous transmission mode configuration of the plurality of network nodes.

7. The apparatus of claim 1, wherein the received information of sleep mode plans comprises at least one of sleep mode configurations and sleep mode patterns of the plurality of network nodes.

8. The apparatus of claim 1, wherein the determined at least one pattern of time periods are synchronizing sleep mode cycles between each of the plurality of network nodes.

9. A method comprising:
    receiving, by a network device, via a self-backhaul link from a plurality of network nodes, information of sleep mode plans of each of the plurality of network nodes;
    determine quality of service requirements of traffic that the plurality of network nodes are serving, wherein the quality of service requirements are determined based on at least one of downlink buffer conditions and uplink resource requests of each of the plurality of network nodes;
    based at least on the determined quality of service requirements of traffic, determining, by the network device, at least one pattern of time periods of the plurality of network nodes indicating time instances where the self-backhaul link is in sleep mode comprising at least one of a sleep period for the self-backhaul link from the plurality of network nodes and sleep periods of the plurality of network nodes themselves that can be used to optimize the sleep mode plans to provide a highest power savings at the plurality of network nodes; and
    sending, by the network device, towards the plurality of network nodes information of the determined at least one pattern of time periods to use to optimize the sleep mode plans to provide the highest power savings at the plurality of network nodes.

10. A non-transitory computer-readable medium storing program code, the program code executed by at least one processor to perform the method of claim 9.

11. A method comprising:
    sending, by a network node, towards a network device via a self-backhaul link, information comprising sleep mode plans of at least one user equipment;
    negotiating, by the network node, with the network device based on quality of service requirements of traffic from the network node, wherein the quality of service requirements are based on at least one of downlink buffer conditions and uplink resource requests of the network device, time periods for the sleep mode plans to determine at least one pattern of time periods indicating time instances where the self-backhaul link is in sleep mode comprising at least one of a sleep period for the self-backhaul link from the plurality of network nodes and sleep periods of the plurality of network nodes themselves that can be used to optimize the sleep mode plans of the at least one user equipment to provide a highest power savings to the at least one user equipment; and receiving, by the network node, from the network device information of the at least one pattern of time periods to use to provide the highest power savings to the at least one user equipment.

12. An apparatus comprising:
at least one processor; and
at least one non-transitory memory including computer program code, where the at least one non-transitory memory and the computer program code are configured, with the at least one processor, to cause the apparatus to at least:
send towards a network device via a self-backhaul link, information comprising sleep mode plans of at least one user equipment;
negotiate with an aggregation node based on quality of service requirements of traffic from the apparatus, wherein the quality of service requirements are based on at least one of downlink buffer conditions and uplink resource requests of the apparatus, time periods for the sleep mode plans to determine at least one pattern of time periods indicating time instances where the self-backhaul link is in sleep mode comprising at least one of a sleep period for the self-backhaul link from the plurality of network nodes and sleep periods of the plurality of network nodes themselves that can be used to optimize sleep modes of the at least one user equipment to provide a highest power savings to the at least one user equipment; and
receive from the network device information of the at least one pattern of the time periods to use to provide the highest power savings to the at least one user equipment.

13. The apparatus of claim 12, wherein the at least one pattern of time periods comprises at least one pattern of discontinuous reception time periods to be used by the apparatus for sleep modes of the at least one user equipment.

14. The apparatus of claim 13, wherein the negotiating is performed using a self-backhaul link.

\* \* \* \* \*